US012074358B2

(12) United States Patent
Fant

(10) Patent No.: US 12,074,358 B2
(45) Date of Patent: Aug. 27, 2024

(54) SYMMETRICAL DUAL DIRECTION COUPLER

(71) Applicant: Qorvo US, Inc., Greensboro, NC (US)

(72) Inventor: Tommaso Fant, Munich (DE)

(73) Assignee: Qorvo US, Inc., Greensboro, NC (US)

( * ) Notice: Subject to any disclaimer, the term of this patent is extended or adjusted under 35 U.S.C. 154(b) by 2 days.

(21) Appl. No.: 18/245,153

(22) PCT Filed: Sep. 22, 2021

(86) PCT No.: PCT/US2021/051481
§ 371 (c)(1),
(2) Date: Mar. 13, 2023

(87) PCT Pub. No.: WO2022/066716
PCT Pub. Date: Mar. 31, 2022

(65) Prior Publication Data

US 2023/0395963 A1 Dec. 7, 2023

Related U.S. Application Data

(60) Provisional application No. 63/083,330, filed on Sep. 25, 2020.

(51) Int. Cl.
*H01P 5/18* (2006.01)

(52) U.S. Cl.
CPC .................................... *H01P 5/18* (2013.01)

(58) Field of Classification Search
None
See application file for complete search history.

(56) References Cited

U.S. PATENT DOCUMENTS

| | | | | |
|---|---|---|---|---|
| 4,420,839 | A * | 12/1983 | Hogerheiden, Jr. | H01P 5/222 333/120 |
| 6,028,494 | A * | 2/2000 | May | H01P 5/12 333/136 |
| 6,822,531 | B2 * | 11/2004 | Carlson | H01P 5/04 333/132 |
| 8,773,216 | B2 * | 7/2014 | Dupont | H01P 5/18 333/110 |
| 10,964,996 | B2 * | 3/2021 | Kim | H01P 5/04 |
| 11,837,770 | B2 * | 12/2023 | Seki | H03H 7/0153 |

(Continued)

OTHER PUBLICATIONS

Feynman, R. et al., "The Feynman Lectures on Physics, vol. II," 1964, Basic Books, 566 pages.

(Continued)

*Primary Examiner* — Thomas J. Hiltunen
(74) *Attorney, Agent, or Firm* — Withrow & Terranova, P.L.L.C.

(57) ABSTRACT

A symmetric dual direction coupler has a layout that is controlled such that there is an axis of symmetry between ports and that any switches used within the dual direction coupler are also symmetrical. That is, for a dual direction coupler having a transmitted port, an input port, an isolated port, and a coupled port with switches used to control forward mode or reverse mode for the coupler, the transmitted port and the input port are symmetrical across the axis of symmetry; the isolated port and coupled port are symmetrical across the axis of symmetry; and the switch layout is symmetrical across the axis of symmetry.

11 Claims, 8 Drawing Sheets

(56) References Cited

U.S. PATENT DOCUMENTS

| | | | | |
|---|---|---|---|---|
| 2009/0284326 | A1* | 11/2009 | Napijalo | H01P 5/185 333/117 |
| 2016/0172737 | A1* | 6/2016 | Srirattana | H01P 5/185 333/101 |
| 2017/0230066 | A1 | 8/2017 | Little et al. | |
| 2018/0351229 | A1 | 12/2018 | Kim et al. | |
| 2024/0006737 | A1* | 1/2024 | Fant | H01P 5/187 |

OTHER PUBLICATIONS

Johnson, H.W. et al., "High-Speed Digital Design: A Handbook of Black Magic," Apr. 1993, Prentice Hall PTR, 446 pages.

Niknejad, A.M. et al., "Chapter 5: Inductance Calculations," in Design, Simulation and Applications of Inductors and Transformers for Si RF Ics, The Springer International Series in Engineering and Computer Science (SECS, vol. 586), Oct. 2000, Springer New York, pp. 59-73.

Niknejad, A.M. et al., "Chapter 6: Calculation of Eddy Current Losses," in Design, Simulation and Applications of Inductors and Transformers for Si RF Ics, The Springer International Series in Engineering and Computer Science (SECS, vol. 586), Oct. 2000, Springer New York, pp. 75-95.

Ott, H. W., "Electromagnetic Compatibility Engineering," John Wiley & Sons, Inc., 2009, 869 pages.

Paul, C.R., "Chapter Four: Transmission Lines and Signal Integrity," in Introduction to Electromagnetic Compatibility, Second Edition, John Wiley & Sons, Inc., 2006, first published Sep. 2005, pp. 177-298.

Paul, C.R., "Chapter Nine: Crosstalk," in Introduction to Electromagnetic Compatibility, Second Edition, John Wiley & Sons, Inc., 2006, first published Sep. 2005, pp. 559-712.

Paul, C.R., "Chapter Eleven: System Design for EMC," in Introduction to Electromagnetic Compatibility, Second Edition, John Wiley & Sons, Inc., 2006, first published Sep. 2005, pp. 767-827.

Niknejad, A.M., "Electromagnetics for High-Speed Analog and Digital Communication Circuits," Cambridge University Press, 2007, 464 pages.

Pozar, D.M., "Microwave Engineering," Fourth Edition, John Wiley & Sons, Inc., 2012, 756 pages.

International Search Report and Written Opinion for International Patent Application No. PCT/US2021/051481, mailed Dec. 14, 2021, 15 pages.

Written Opinion for International Patent Application No. PCT/US2021/051481, mailed May 13, 2022, 9 pages.

International Preliminary Report on Patentability for International Patent Application No. PCT/US2021/051481, mailed Jan. 5, 2023, 18 pages.

* cited by examiner

SYMMETRICAL DUAL DIRECTION COUPLER

RELATED APPLICATIONS

This application is a 35 USC 371 national phase filing of International Application No. PCT/US2021/051481, filed Sep. 22, 2021, which claims the benefit of U.S. provisional patent application Ser. No. 63/083,330, filed Sep. 25, 2020, the disclosures of which are incorporated herein by reference in their entireties.

FIELD OF THE DISCLOSURE

The technology of the disclosure relates generally to a dual direction coupler for use in radio frequency (RF) transceivers.

BACKGROUND

Computing devices have become increasingly common for myriad purposes including providing wireless communication services. The prevalence of these computing devices is driven in part by the many functions that are enabled on such devices. In addition to the many functions, the size and cost of computing devices are at a point where almost anyone can afford at least a rudimentary computing device.

A common element in most mobile computing devices is a radio frequency (RF) front end module that conditions incoming signals for further processing and outgoing signals for transmission. Such front end modules may be subject to various protocols and standards with respect to power levels used for transmission. Likewise, incoming signals may have design constraint power restrictions used to avoid damaging delicate circuitry. A common way to measure power levels is through the use of a coupler that allows signals in a communication path to be measured. In front end modules, it is not uncommon to have a dual direction coupler that measures incoming and outgoing signals using the same basic circuitry.

Where such dual direction couplers are used, there may be mismatches in impedance based on direction, which may negatively impact performance and/or directivity. Accordingly, there remains a need for a better dual direction coupler.

SUMMARY

Embodiments of the disclosure relate to a symmetric dual direction coupler. In particular, layout of the dual direction coupler is controlled such that there is an axis of symmetry between ports and that any switches used within the dual direction coupler are also symmetrical. That is, for a dual direction coupler having a transmitted port, an input port, an isolated port, and a coupled port with switches used to control forward mode or reverse mode for the coupler, the transmitted port and the input port are symmetrical across the axis of symmetry; the isolated port and coupled port are symmetrical across the axis of symmetry; and the switch layout is symmetrical across the axis of symmetry. In this manner, elements contributing to the forward path and the reverse path are symmetrical to create symmetrical coupling factors, and directivity.

In one aspect, a dual direction coupler is disclosed. The dual direction coupler comprises a first port. The dual direction coupler also comprises a second port. The dual direction coupler also comprises a first conductive path coupling the first port to the second port. The first conductive path is symmetrical between the first port and the second port across an axis of symmetry. The dual direction coupler also comprises a third port coupled to ground. The dual direction coupler also comprises a fourth port symmetrically positioned relative to the third port across the axis of symmetry. The dual direction coupler also comprises a second conductive path coupling the third port to the fourth port. The second conductive path is electromagnetically coupled to the first conductive path. The second conductive path comprises one or more switches. The second conductive path is symmetrical across the axis of symmetry In another aspect, a radio frequency (RF) front end module is disclosed. The RF front end module comprises a filter. The RF front end module also comprises a power amplifier coupled to the filter. The RF front end module also comprises a dual direction coupler. The dual direction coupler comprises a first port coupled to the filter. The dual direction coupler also comprises a second port. The dual direction coupler also comprises a first conductive path coupling the first port to the second port. The first conductive path is symmetrical between the first port and the second port across an axis of symmetry. The dual direction coupler also comprises a third port coupled to ground. The dual direction coupler also comprises a fourth port symmetrically positioned relative to the third port across the axis of symmetry. The dual direction coupler also comprises a second conductive path coupling the third port to the fourth port. The second conductive path is electromagnetically coupled to the first conductive path. The second conductive path comprises one or more switches. The second conductive path is symmetrical across the axis of symmetry.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
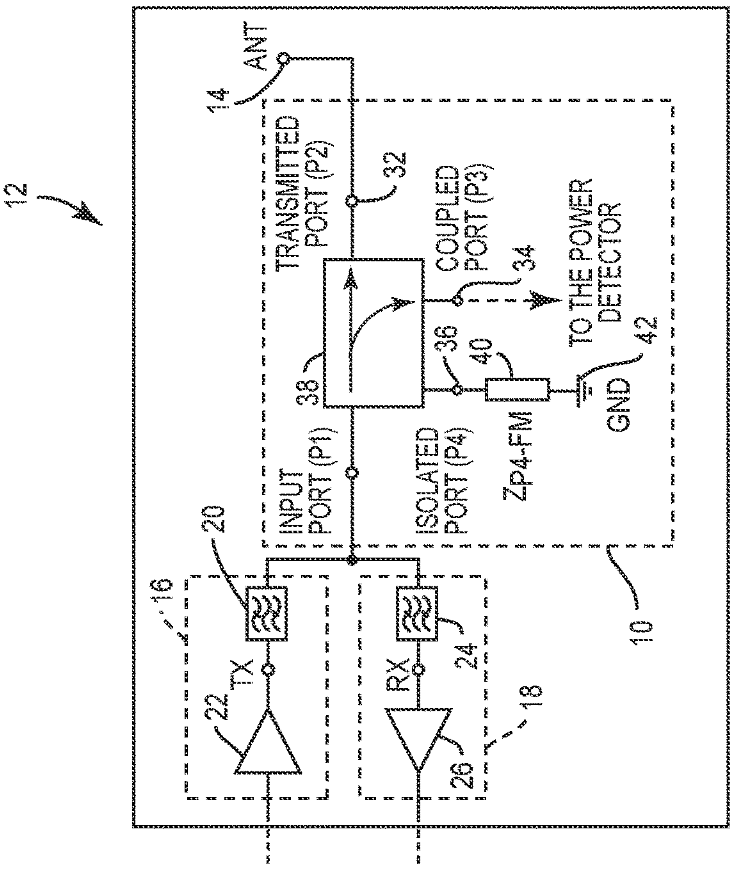
FIG. 1A is a schematic diagram of a dual direction coupler operating in a forward mode.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a symmetric dual direction coupler. In particular, layout of the dual direction coupler is controlled such that there is an axis of symmetry between ports and that any switches used within the dual direction coupler are also symmetrical. That is, for a dual direction coupler having a transmitted port, an input port, an isolated port, and a coupled port with switches used to control forward mode or reverse mode for the coupler, the transmitted port and the input port are symmetrical across the axis of symmetry; the isolated port and coupled port are symmetrical across the axis of symmetry; and the switch layout is symmetrical across the axis of symmetry. In this manner, elements contributing to the forward path and the reverse path are symmetrical to create symmetrical coupling factors, and directivity.

Before addressing exemplary aspects of the present disclosure, a background on dual direction couplers is provided along with a discussion of the impact directionality and coupling factors have on performance. With this background a discussion of exemplary aspects of the present disclosure begins below with reference to FIG. 4.

Figure 1B:
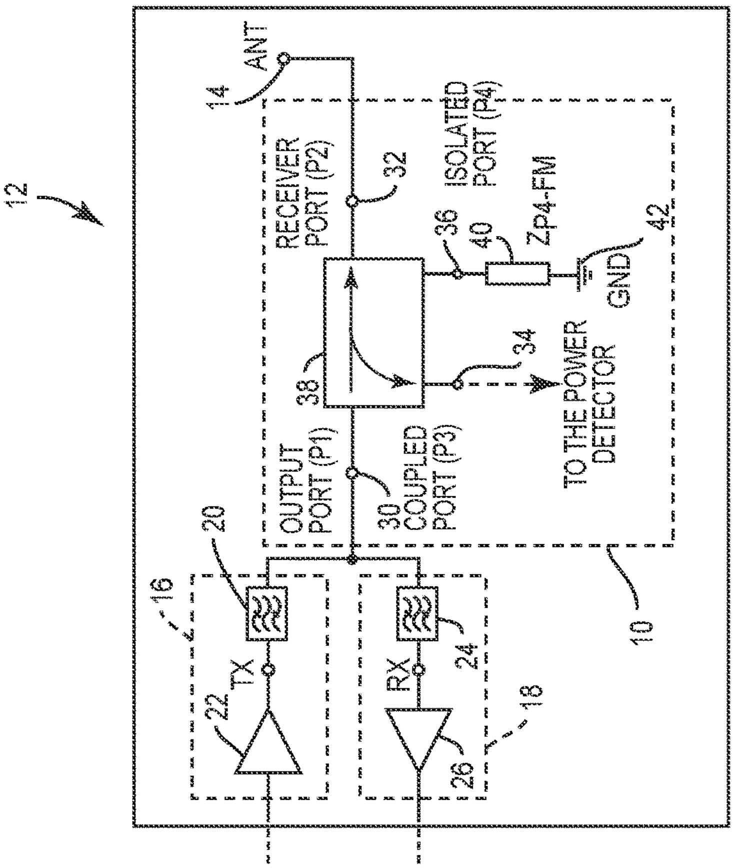
FIG. 1B is a schematic diagram of the dual direction coupler of FIG. 1A operating in a reverse mode.

In this regard, FIGS. 1A and 1B show a dual direction coupler 10 in a forward mode (FIG. 1A) and in a reverse mode (FIG. 1B) while positioned within a radio frequency (RF) front end module 12. The RF front end module 12 may include an antenna 14 coupled to the dual direction coupler 10 as well as a transmitter chain 16 and receive chain 18. The transmitter chain 16 may include a first filter 20 and a first power amplifier 22 that are designed to condition a signal for transmission through the antenna 14. Similarly, the receive chain 18 may include a second filter 24 and a second power amplifier 26 (e.g., a low noise amplifier (LNA)) that takes a signal received by the antenna 14, conditions the signal and specifically amplifies the signal for use by other elements within the RF front end module 12 (e.g., a baseband processor or the like).

The dual direction coupler 10 includes a first port 30 (also referred to as a first input port or P1), a second port 32 (also referred to as a second input port or P2), a third port 34 (also referred to as a coupled port or P3), and a fourth port 36 (also referred to as an isolated port or P4) along with a coupler element 38. The first port 30 may be coupled to the transmit chain 16 and the receive chain 18 and more particularly may be coupled to the filters 20, 24. The second port 32 may be coupled to the antenna 14. The third port 34 may be coupled to a power detector (not shown). The fourth port 36 may be coupled through an impedance element 40 to a ground 42.

When operating in a forward mode, such as shown in FIG. 1A, a signal may originate in a baseband processor (not shown) and be passed to a transceiver within the RF front end module 12 where the signal is amplified by the power amplifier 22, filtered by the filter 20 and then passes through the dual direction coupler 10. Within the dual direction coupler 10, the signal passes from the first port 30 to the second port 32. The coupler element 38 causes a portion of the signal to be copied and output at the third port 34. The power detector (not shown) may measure the power of the signal to be transmitted and provide feedback to other circuitry so that adjustments to control the power output by the power amplifier 22 and the antenna voltage standing wave radio (VSWR).

Similarly, when operating in a reverse mode, such as shown in FIG. 1B, a signal may impinge on the antenna 14 generating a signal at the second port 32, which is passed to the receive chain 18 through the first port 30 for conditioning and further processing. Some portion of the received signal is copied and output at the third port 34.

The ratio between the power at the second port 32 and the third port 34 is sometimes called the coupling factor and is considered one of the figures of merit (FOM) for coupler design. Another key FOM is directivity, which describes the ability of the coupler to isolate between forward and reverse signals. The higher the directivity, the smaller the error on the antenna VSWR estimate. In general, the load generated by the impedance element 40 is chosen to maximize directivity in both forward and reverse modes. However, the load value for the impedance element 40 may vary between the two modes.

Designing dual direction couplers poses challenges. Specifically, unequal coupling factors between forward mode and reverse mode may lead to an error on estimates of the antenna VSWR, particularly if no compensation for such difference is used. Further, in the impedance element 40 may have a different load in forward mode relative to reverse mode, which may result in challenges during implementation, which may lead to larger die size and additional design effort as well as poor directivity in at least one direction generally. It should be appreciated that both coupling factor and directivity may be functions of the load, setting a trade-off between having congruent coupling factors and directivity maximization.

Figure 2B:
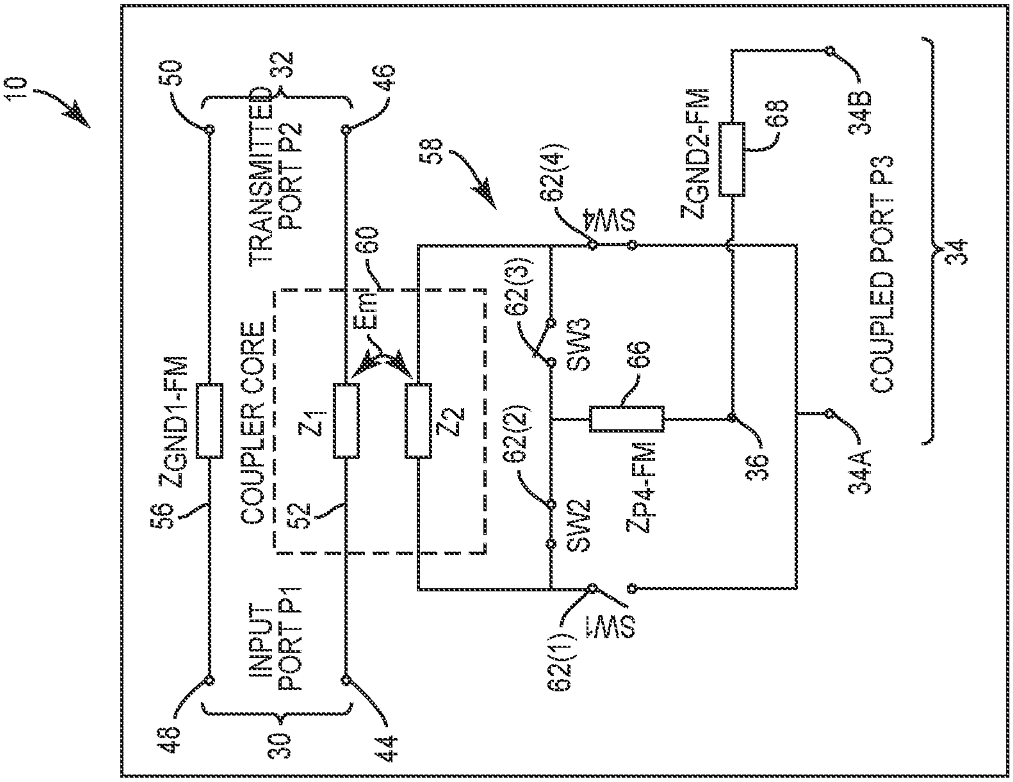
FIG. 2B is a schematic diagram of the dual direction coupler of FIG. 1B with impedances shown.
Figure 2A:
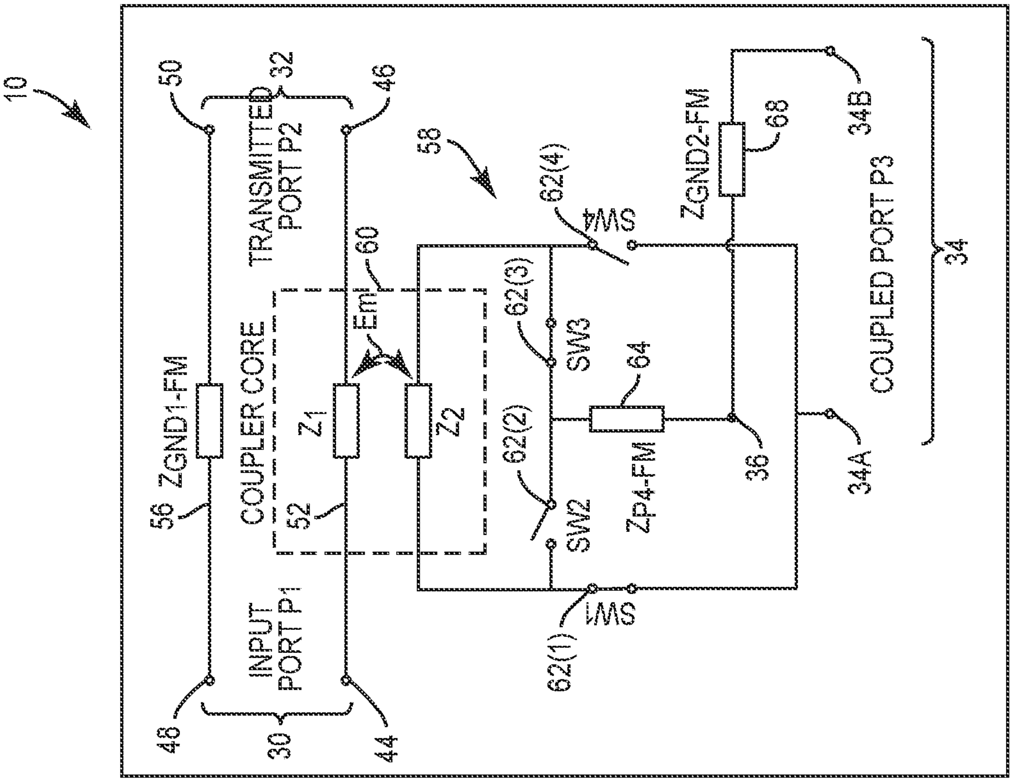
FIG. 2A is a schematic diagram of the dual direction coupler of FIG. 1A with impedances shown.

FIGS. 2A and 2B provide additional details about the dual direction coupler 10. It should be appreciated that the first port 30 and the second port 32 may be two terminal ports, where terminals 44, 46 may be the terminals at which the active signal is input/output and the other terminals 48, 50 may be the ground return path in accordance with the vector potential. Accordingly, there is a first conductive path 52 having an impedance 54 (also referred to as $Z_1$) between the terminals 44, 46. Additionally, there is a ground conductive path 56 between the terminals 48, 50 having an impedance $Z_{GND1}$, which may vary based on whether the coupler 10 is in forward mode or reverse mode (i.e., $Z_{GND1\text{-}FM}$ or $Z_{GND1\text{-}RM}$). A second conductive path 58 couples the third port 34 to the fourth port 36. Note that the third port 34 may have two terminals as well 34A, 34B The first conductive path 52 is electromagnetically coupled (arrow EM) to the second conductive path 58 in a coupler core 60. Note that the coupler core 60 may be a physical element such as a ferromagnetic core, or at the frequencies of interest, may just be an area where the first conductive path 56 is proximate the second conductive path 58 such that a changing electric current on the first conductive path 56 creates a changing magnetic field that induces an electric current on the second conductive path 58 as is well understood.

The second conductive path 58 includes switches 62(1)-62(4) that allow switching between forward mode and reverse mode in the coupler 10. Specifically, in the forward mode illustrated in FIG. 2A, the switches 62(2) and 62(4) are open, and the switches 62(1) and 62(3) are closed whereas, in the reverse mode the switches 62(2) and 62(4) are closed and the switches 62(1) and 62(3) are open. Switching in this manner allows the impedance element 40 to change from a forward mode impedance 64 ($Z_{P4\text{-}FM}$) to a reverse mode impedance 66 ($Z_{P4\text{-}RM}$). Further, a ground impedance 68 may change from a forward mode ($Z_{GND2\text{-}FM}$) to a reverse mode ($Z_{GND2\text{-}RM}$). There may be a coupling between the ground return impedances ($Z_{GNDi\text{-}FM/RM}$).

Note further that the coupler 10 may be made on a substrate. It has been observed that the thicker the substrate, the greater the difference in performance in terms of different directivity and differences in coupling factor.

To achieve congruent performance between forward and reverse modes, the two second conductive paths 58 shown in FIGS. 2A and 2B must also be congruent. However, if the current in one mode follows a different return path compared to the other, it is likely that $Z_{GNDi\text{-}FM}$ will not equal $Z_{GNDi\text{-}RM}$. A closer examination of the ground return path may assist in understanding. Accordingly, a more detailed examination of the coupler core 60 is provided with reference to FIGS. 3A and 3B.

Figure 3B:
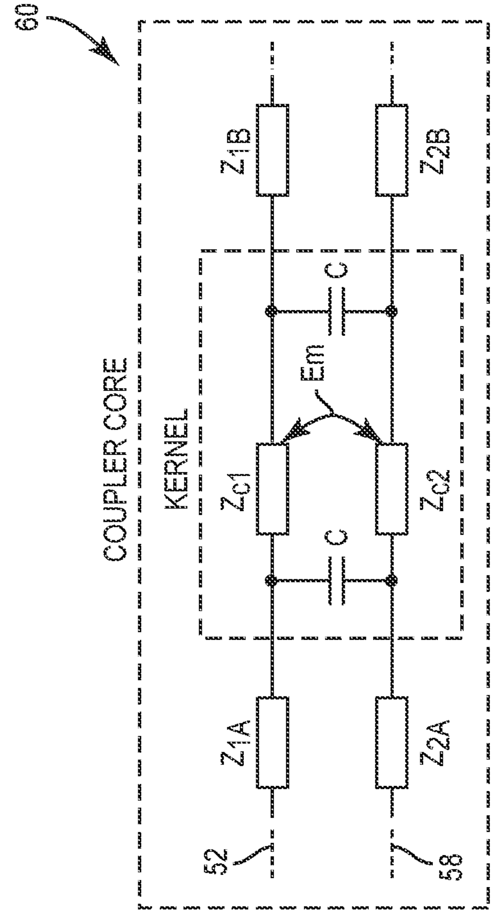
FIG. 3B is a more detailed schematic diagram of the coupler core of FIG. 3A with the kernel of the core, and the kernel's impedances shown.
Figure 3A:
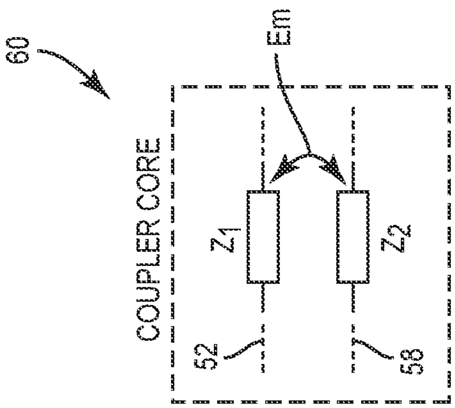
FIG. 3A is a schematic diagram of a coupler core.

FIG. 3A illustrates the coupler core 60 and the impedances $Z_1$ and $Z_2$ of the two conductive paths 52 and 58. FIG. 3B provides an equivalent circuit for the coupler core 60 where $Z_1$ is actually three impedance elements $Z_{1A}$, $Z_{c1}$, and $Z_{1B}$ and $Z_2$ is likewise three impedance elements $Z_{2A}$, $Z_{c2}$, and $Z_{2B}$. Additional capacitors C may exist between the conductive paths 52, 58. $Z_{c1}$ and $Z_{c2}$ are coupled with each other and together with capacitors C represent the kernel of the coupler core 60. $Z_{1A}$, $Z_{1B}$, $Z_{2A}$, and $Z_{2B}$ can be perceived as parasitic, modeling the metal lines interconnecting the kernel to the remaining circuitry and ports.

To achieve congruent performance, exemplary aspects of the present disclosure assist in making sure that $Z_{1A}$ equals $Z_{1B}$ and $Z_{2A}$ equals $Z_{2B}$. This is done by minimizing or removing asymmetries in terms of coupling factor and directivity. That is, once the first port and the second port are located on a substrate as part of the design, an axis of symmetry is drawn and serves as a reference for symmetrical layout of the RF circuit. In an exemplary aspect, to facilitate a symmetrical return path for the current between forward and reverse modes, the third port and the fourth port fall or are positioned on the axis of symmetry.

Figure 4:
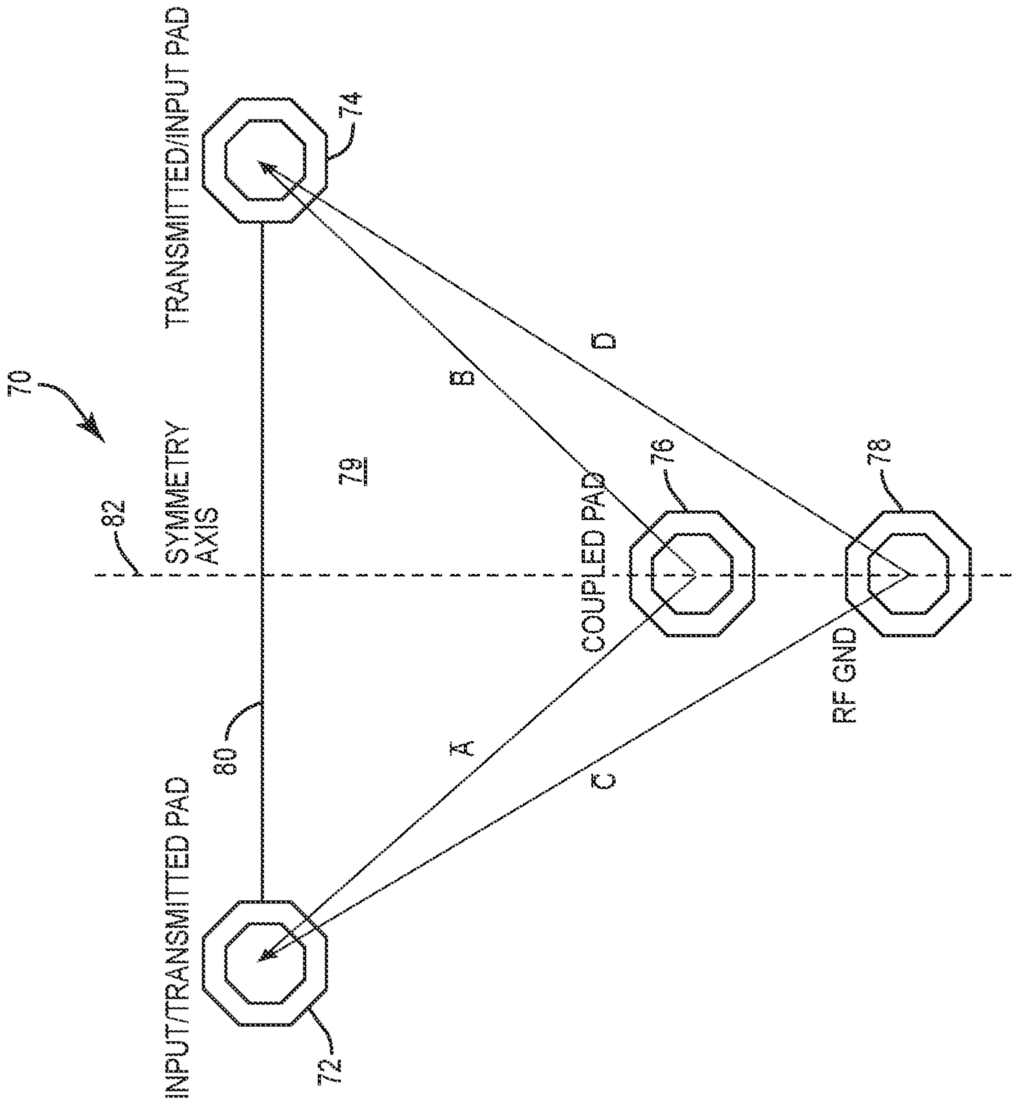
FIG. 4 illustrates a top plan view of ports for a symmetrical dual direction coupler according to an exemplary aspect of the present disclosure.

Conceptually, this positioning is illustrated in FIG. 4, where a dual direction coupler 70 includes a first port 72, a second port 74, a third port 76, and a fourth port 78 positioned on a substrate 79. The ports 72, 74, 76, and 78 may sometimes be referred to as a pad and may be two terminals as previously described. The first port 72 and the second port 74 are input/output ports analogous to ports 30, 32 of the dual direction coupler 10. The third port 76 is a coupled port configured to be coupled to a power detector or the like and is analogous to the port 34 of the dual direction coupler 10. The fourth port 78 may be a ground or terminated port analogous to the port 36 of the dual direction coupler 10. The first port 72 and the second port 74 define a line 80 therebetween. An axis of symmetry 82 bisects the line 80. The third port 76 and the fourth port 78 are positioned on the axis of symmetry 82. As illustrated, the third port 76 is closer to the line 80 than the fourth port 78. Note that the positions of the third port 76 and the fourth port 78 may be switched such that the fourth port 78 is closer to the line 80 than the third port 76. Line A extends from the first port 72 to the third port 76. Line $\overline{B}$ extends from the second port 74 to the third port 76. Line $\overline{C}$ extends from the first port 72 to the fourth port 78. Line D extends from the second port 74 to the fourth port 78. By using the axis of symmetry 82, it possible to guarantee that line $\overline{A}$ has a magnitude or length equal to line $\overline{B}$. Likewise, line $\overline{C}$ has a magnitude or length equal to line $\overline{D}$. Now to make congruent performance, the layout of the RF circuit is also symmetrical across the axis of symmetry 82.

By making the layout of the RF circuit symmetrical across the axis of symmetry 82, $Z_{1A}$ equals $Z_{1B}$ and $Z_{2A}$ equals $Z_{2B}$. Further, unlike past coupler designs where substrate thickness may exacerbate asymmetries, the thickness of substrate 79 does not materially affect performance. To the extent that any asymmetries exist as a function of real-world manufacturing tolerances, such asymmetries should have minimal impact on performance as these asymmetries primarily affect directivity, for which there is compensation in the form of dedicated impedance loads. Such minor asymmetries have negligible impact on the coupling factor.

Figure 5:
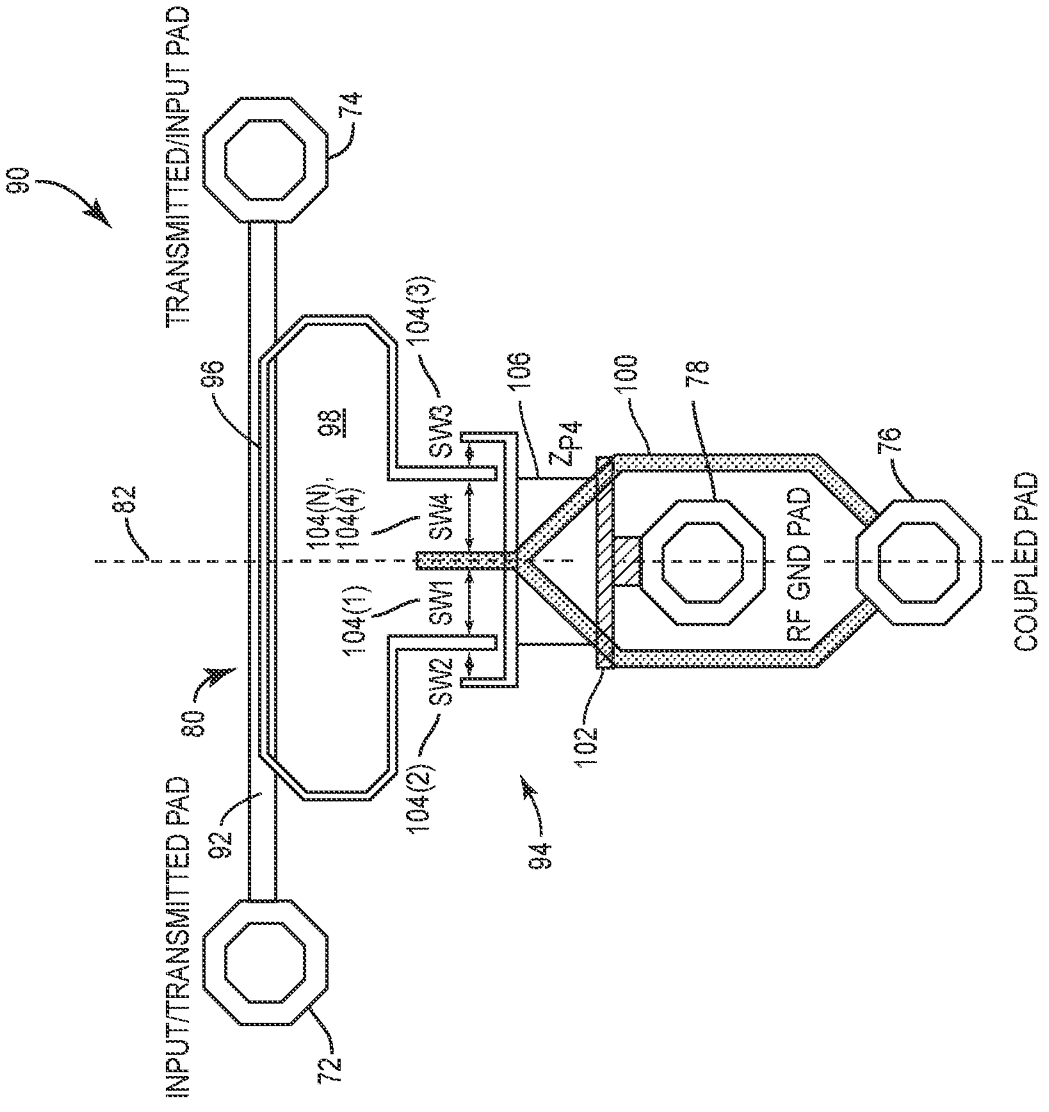
FIG. 5 illustrates a top plan view of the symmetrical dual direction coupler of FIG. 4 with symmetrical switches and conductive paths shown according to an exemplary aspect of the present disclosure.
Figure 7:
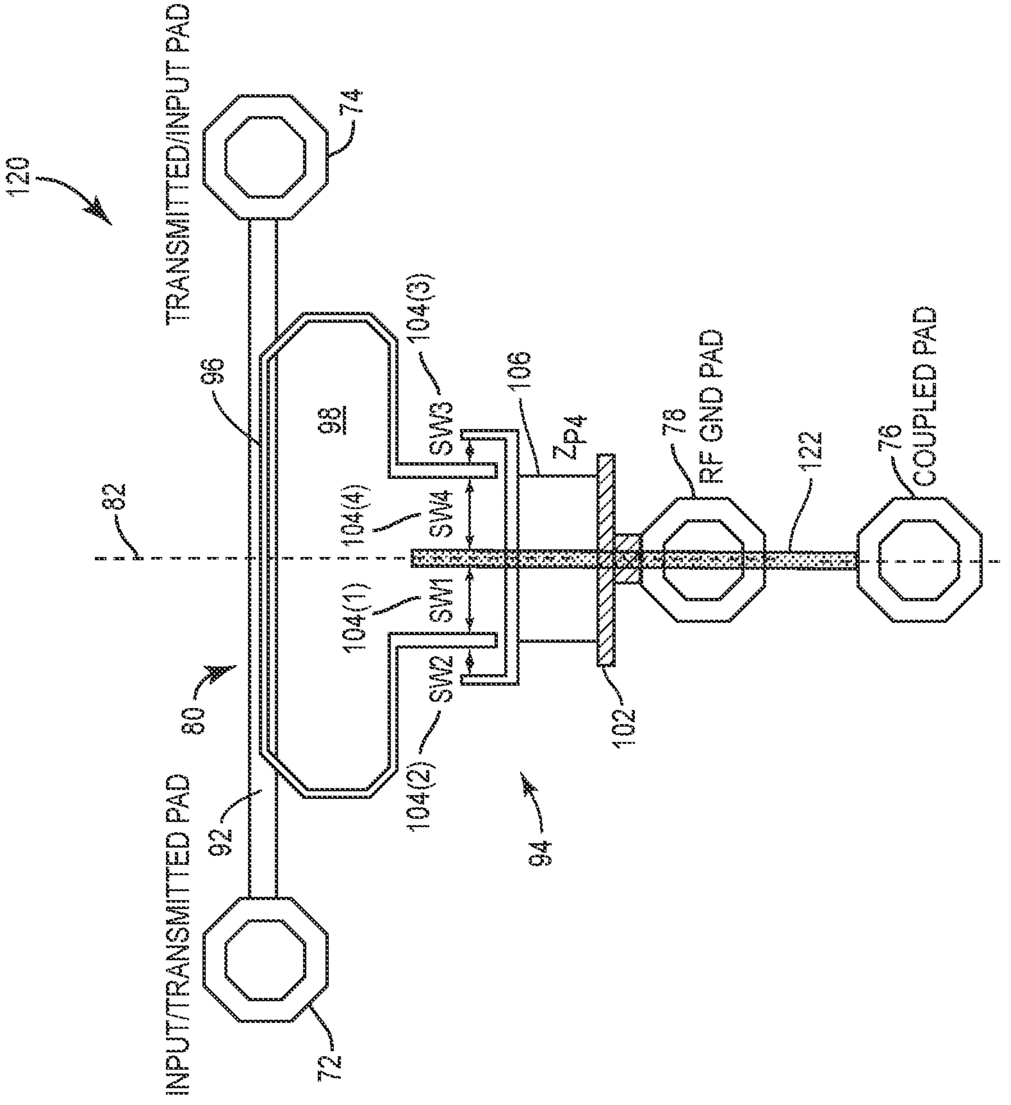
FIG. 7 illustrates a top plan view of a symmetrical dual direction coupler with symmetrical switches and conductive paths according to an alternate aspect of the present disclosure.

FIGS. 5 and 7 illustrate two possible layouts that satisfy the requirements explained in relation to FIG. 4. Note that these are not the only possible circuit layouts and other layouts may be used without departing from the present disclosure. For example, while not illustrated, the third port 76 and the fourth port 78 may be on opposite sides of line 80.

With reference to FIG. 5, a dual direction coupler 90 includes the first port 72 and the second port 74 coupled to one another by a first conductive path 92 extending therebetween. In an exemplary aspect, the first conductive path 92 follows the line 80 (i.e., extends directly between the first port 72 and the second port 74) and is symmetrical between the first port 72 and the second port 74 across the axis of symmetry 82. That is, the axis of symmetry 82 bisects the first conductive path 92. The dual direction coupler 90 also includes the third port 76 and the fourth port 78. The fourth port 78 is symmetrically positioned relative to the third port 76 across the axis of symmetry 82. A second conductive path 94 couples the third port 76 to the fourth port 78. The second conductive path 94 is electromagnetically coupled to the first conductive path 92. As illustrated, the second conductive path 94 includes a first portion 96 that is positioned parallel to the first conductive path 92 and is further positioned in a second plane above a plane containing the first conductive path 92. That is the first conductive plane 92 lies in a first plane and the second conductive path 94 lies in a second plane different than and above the first plane. A dielectric material (e.g., part of a substrate 98) may be positioned between the first conductive path 92 and the second conductive path 94.

The second conductive path 94 is symmetrical across the axis of symmetry 82 and may have, as noted a first portion 96 that couples to a second portion 100 and a third portion 102 through one or more switches 104(1)-104(N), where as illustrated N is four (4). The second portion 100 is coupled directly to the third port 76. The third portion is coupled directly to the fourth port 78. The switches 104(1)-104(4) selectively couple the first portion 96 to the second portion 100 or the third portion 102. Specifically, a first switch 104(1) selectively couples the first portion 96 to the second portion 100. A second switch 104(2) selectively couples the first portion to the third portion 102. A third switch 104(3) selectively couples the first portion 96 to the third portion 102. A fourth switch 104(4) selectively couples the first portion 96 to the second portion 100. The third portion 102 includes an impedance element 106 ($Z_{P4}$) between the switches 104(1), 104(4) and the fourth port 78. As illustrated, the second portion 100 is a generally hexagonal shape although as illustrated in FIG. 7, other shapes are possible.

Figure 6A:
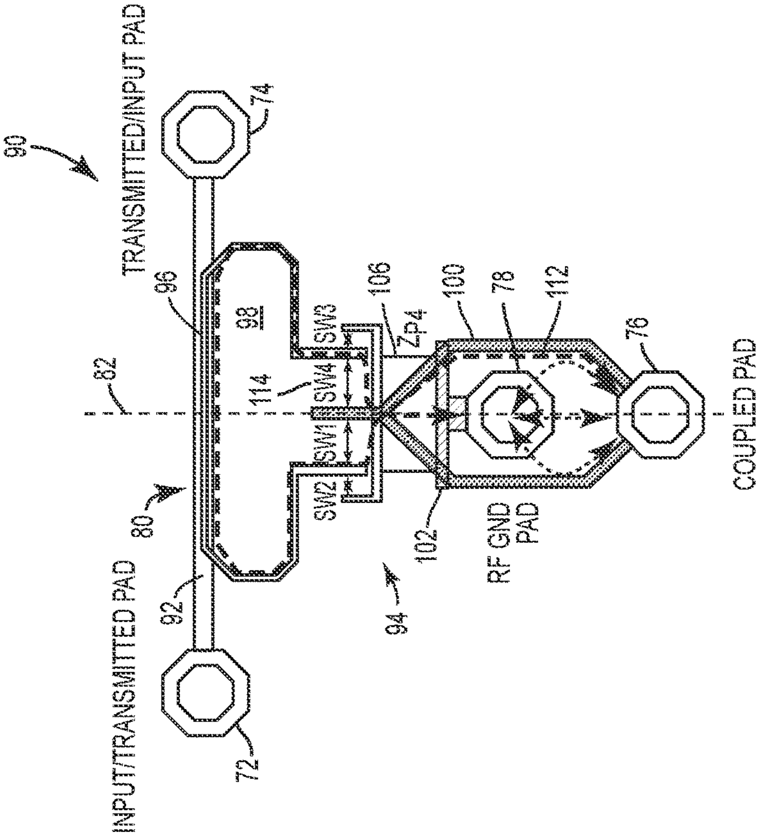
FIG. 6A illustrates current flows for the dual direction coupler of FIG. 5 in a forward mode.
Figure 6B:
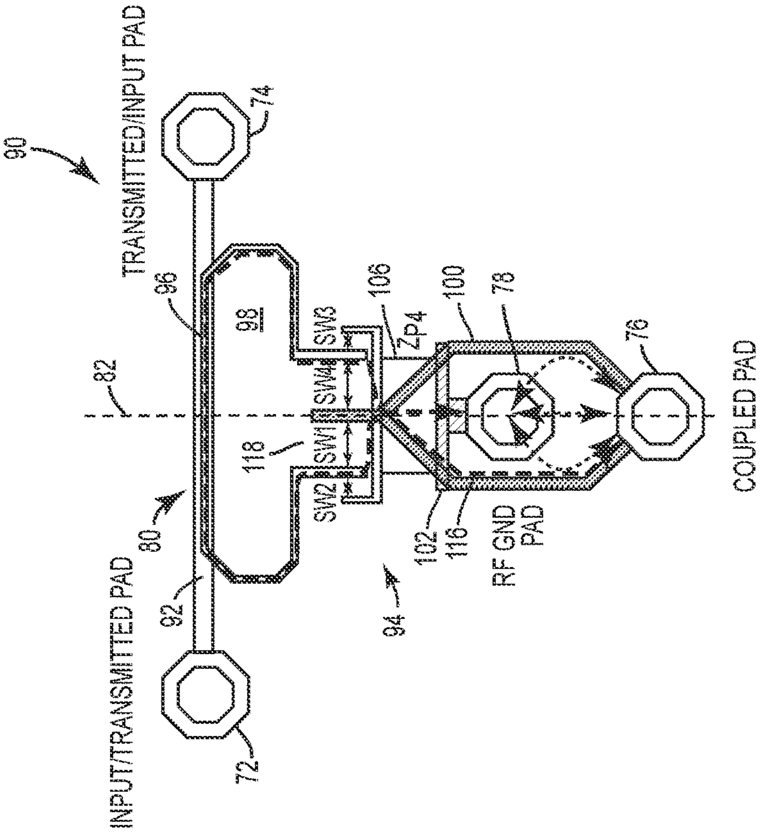
FIG. 6B illustrates current flows for the dual direction coupler of FIG. 5 in a reverse mode.

FIGS. 6A and 6B illustrate current flows 108A, 108B, and 110 that exist in the coupler 90 depending on whether the coupler 90 is operating in a forward mode or a reverse mode. Specifically, the current flow 110 that lies between the third port 76 and the fourth port 78 is the same in either direction, but current flow 108A travels along a first branch 112 of the second portion 100 to the third port 76 and along first side 114 of the third portion 102 to the fourth port 78. In contrast, the current flow 108B travels along a second branch 116 of the second portion 100 to the third port 76 and along a second side 118 of the third portion 102 to the fourth port 78. Note that as the thickness of the substrate 98 increases, the current flow along paths 108A, 108B decreases and the current flow 110 dominates. However, this change does not materially affect performance.

FIG. 7 illustrates an alternate layout for a coupler 120. In many regards, the structure is the same and components are similarly numbered, but in contrast to the hexagonal second portion, the second portion 122 is a line that lies on the axis of symmetry 82. Operation of the switches 104(1)-104(4) remains the same.

As alluded to earlier, dual direction couplers such as those described herein may be found in myriad computing devices such as a mobile terminal. An exemplary mobile terminal 200 that may include one of the dual direction couplers described herein is provided with reference to FIG. 8. In this regard, FIG. 8 is a system-level block diagram of an exemplary mobile terminal 200 such as a smart phone, mobile computing device tablet, or the like.

Figure 8:
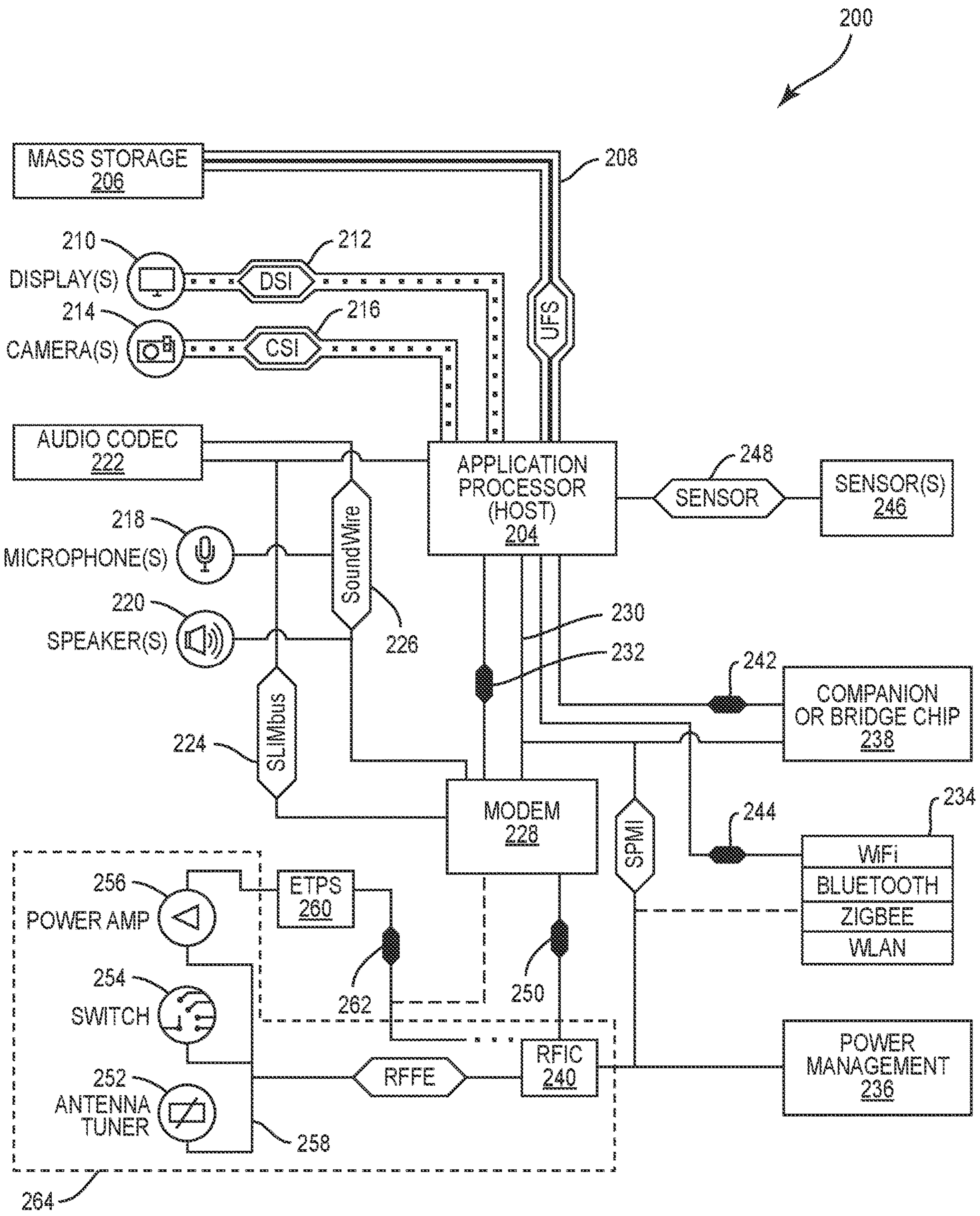
FIG. 8 illustrates a wireless communication device that may include a symmetrical dual direction coupler of the present disclosure in, for example, a radio frequency (RF) front end component.

With continued reference to FIG. 8, the mobile terminal 200 includes an application processor 204 (sometimes referred to as a host) that communicates with a mass storage element 206 through a universal flash storage (UFS) bus 208. The application processor 204 may further be connected to a display 210 through a display serial interface (DSI) bus 212 and a camera 214 through a camera serial interface (CSI) bus 216. Various audio elements such as a microphone 218, a speaker 220, and an audio codec 222 may be coupled to the application processor 204 through a serial low-power interchip multimedia bus (SLIMbus) 224. Additionally, the audio elements may communicate with each other through a SOUNDWIRE bus 226. A modem 228 may also be coupled to the SLIMbus 224 and/or the SOUNDWIRE bus 226. The modem 228 may further be connected to the application processor 204 through a peripheral component interconnect (PCI) or PCI express (PCIe) bus 230 and/or a system power management interface (SPMI) bus 232.

With continued reference to FIG. 8, the SPMI bus 232 may also be coupled to a local area network (LAN or WLAN) IC (LAN IC or WLAN IC) 234, a power management integrated circuit (PMIC) 236, a companion IC (sometimes referred to as a bridge chip) 238, and a radio frequency IC (RFIC) 240. It should be appreciated that separate PCI buses 242 and 244 may also couple the application processor 204 to the companion IC 238 and the WLAN IC 234. The application processor 204 may further be connected to sensors 246 through a sensor bus 248. The modem 228 and the RFIC 240 may communicate using a bus 250.

With continued reference to FIG. 8, the RFIC 240 may couple to one or more RFFE elements, such as an antenna tuner 252, a switch 254, and a power amplifier 256 through a radio frequency front end (RFFE) bus 258. Additionally, the RFIC 240 may couple to an envelope tracking power supply (ETPS) 260 through a bus 262, and the ETPS 260 may communicate with the power amplifier 256. Collectively, the RFFE elements, including the RFIC 240, may be considered an RFFE system 264. It should be appreciated that the RFFE bus 258 may be formed from a clock line and a data line (not illustrated). While dual direction couplers may be provided in any number of elements within a mobile terminal, it should be appreciated that elements such as the switch 254 may rely heavily on a dual direction coupler.

Those skilled in the art will recognize improvements and modifications to the preferred embodiments of the present disclosure. All such improvements and modifications are considered within the scope of the concepts disclosed herein and the claims that follow.

What is claimed is:

1. A dual direction coupler, comprising:
- a first port comprising a first pad;
- a second port comprising a second pad;
- a first conductive path coupling the first port to the second port, the first conductive path being symmetrical between the first port and the second port across an axis of symmetry;
- a third port comprising a third pad coupled to ground;
- a fourth port comprising a fourth pad, wherein the third pad and the fourth pad are positioned on the axis of symmetry; and
- a second conductive path coupling the third port to the fourth port, the second conductive path electromagnetically coupled to the first conductive path, the second conductive path comprising one or more switches, the second conductive path being symmetrical across the axis of symmetry, wherein the second conductive path comprises a first portion parallel to the first conductive path, a second portion having a hexagonal shape coupled directly to the third port and a third portion coupled directly to the fourth port.

2. The dual direction coupler of claim 1, further comprising a dielectric material positioned between the first conductive path and the second conductive path.

3. The dual direction coupler of claim 2, wherein the first conductive path lies in a first plane and the second conductive path lies in a second plane different than the first plane.

4. The dual direction coupler of claim 2, wherein the second conductive path is positioned at least partially over the first conductive path.

5. The dual direction coupler of claim 1, wherein the one or more switches comprise four switches.

6. The dual direction coupler of claim 1, wherein the one or more switches comprise:
- a first switch selectively coupling the first portion to the second portion;
- a second switch selectively coupling the first portion to the third portion;
- a third switch selectively coupling the first portion to the third portion; and
- a fourth switch selectively coupling the first portion to the second portion.

7. The dual direction coupler of claim 1, wherein the second portion comprises a line.

8. A radio frequency (RF) front end module comprising:
- a filter;
- a power amplifier coupled to the filter; and
- a dual direction coupler comprising:
  - a first port comprising a first pad coupled to the filter;
  - a second port comprising a second pad;
  - a first conductive path coupling the first port to the second port, the first conductive path being symmetrical between the first port and the second port across an axis of symmetry;
  - a third port comprising a third pad coupled to ground;
  - a fourth port comprising a fourth pad, wherein the third pad and the fourth pad are positioned on the axis of symmetry; and
  - a second conductive path coupling the third port to the fourth port, the second conductive path electromagnetically coupled to the first conductive path, the second conductive path comprising one or more switches, the second conductive path being symmetrical across the axis of symmetry, wherein the second conductive path comprises a first portion parallel to the first conductive path, a second portion having a hexagonal shape coupled directly to the third port, and a third portion coupled directly to the fourth port.

9. The RF front end module of claim 8, further comprising a second filter and a second power amplifier coupled to the first port.

10. The RF front end module of claim 8, wherein the one or more switches comprise four switches.

11. The RF front end module of claim 8, wherein the one or more switches comprise:
- a first switch selectively coupling the first portion to the second portion;
- a second switch selectively coupling the first portion to the third portion;
- a third switch selectively coupling the first portion to the third portion; and
- a fourth switch selectively coupling the first portion to the second portion.

* * * * *